US012777074B2

(12) United States Patent
Chua

(10) Patent No.: US 12,777,074 B2
(45) **Date of Patent: *Oct. 27, 2026**

(54) MULTIPLE SENTINELS FOR SECURING COMMUNICATIONS

(71) Applicant: Zhnith Incorporated, Santa Rosa, CA (US)

(72) Inventor: Andrew Chua, Emeryville, CA (US)

(73) Assignee: ZHNITH INCORPORATED, Pompano Beach, FL (US)

( * ) Notice: Subject to any disclaimer, the term of this patent is extended or adjusted under 35 U.S.C. 154(b) by 453 days.

This patent is subject to a terminal disclaimer.

(21) Appl. No.: 18/464,457

(22) Filed: Sep. 11, 2023

(65) Prior Publication Data

US 2023/0421612 A1 Dec. 28, 2023

Related U.S. Application Data

(63) Continuation of application No. 17/528,904, filed on Nov. 17, 2021, now Pat. No. 11,792,231, which is a (Continued)

(51) Int. Cl.
*H04L 9/40* (2022.01)
*G06F 21/46* (2013.01)
*H04L 9/32* (2006.01)

(52) U.S. Cl.
CPC .............. *H04L 63/20* (2013.01); *G06F 21/46* (2013.01); *H04L 9/3226* (2013.01); *H04L 63/083* (2013.01)

(58) Field of Classification Search
CPC ..... H04L 63/20; H04L 9/3226; H04L 63/083; H04L 63/0838; H04L 63/0846;
(Continued)

(56) References Cited

U.S. PATENT DOCUMENTS 4,757,533 A 7/1988 Allen et al.
6,105,133 A 8/2000 Fielder et al.
(Continued)

FOREIGN PATENT DOCUMENTS

CN 108040507 B * 12/2022 ........... H04L 9/3234
WO 2017/007725 A1 1/2017

OTHER PUBLICATIONS

International Search Report and Written Opinion received for PCT Application Serial No. PCT/US2020/014180 dated Apr. 17, 2020, 26 pages.

(Continued)

*Primary Examiner* — John B King
(74) *Attorney, Agent, or Firm* — Amin, Turocy & Watson, LLP

(57) ABSTRACT

Techniques that facilitate multiple sentinels for securing communications are provided. In one example, a system communicates with at least one multi-purpose device configured to communicate with one or more sources, at least one computing device configured to communicate with a defined source that is different than the one or more sources, and at least one security sentinel that manages one or more security processes for a communication network associated with the at least one multi-purpose device and the at least one computing device. The system also manages one or more other security processes for the communication network associated with the at least one multi-purpose device and the at least one computing device.

11 Claims, 10 Drawing Sheets

Related U.S. Application Data continuation of application No. 16/743,773, filed on Jan. 15, 2020, now Pat. No. 11,212,319.

(60) Provisional application No. 62/796,137, filed on Jan. 24, 2019.

(58) Field of Classification Search
CPC ....... H04L 9/0662; H04L 9/12; H04L 9/3231; H04L 9/0869; G06F 21/46; G06F 21/577; G06F 21/606
See application file for complete search history.

(56) References Cited

U.S. PATENT DOCUMENTS

| | | | | |
|---|---|---|---|---|
| 7,278,024 | B2 | 10/2007 | Sundararajan et al. | |
| 7,305,548 | B2 * | 12/2007 | Pierce | H04L 63/0428 380/30 |
| 9,178,855 | B1 * | 11/2015 | Yung | H04L 9/0822 |
| 9,222,285 | B1 | 12/2015 | Ilislamloo et al. | |
| 9,531,692 | B2 * | 12/2016 | Barbir | H04L 9/085 |
| 10,009,173 | B2 | 6/2018 | Bar-El et al. | |
| 11,431,561 | B2 | 8/2022 | Smith et al. | |
| 12,307,446 | B2 * | 5/2025 | Varadarajan | H04L 63/083 |
| 2002/0078381 | A1 * | 6/2002 | Farley | H04L 43/00 726/23 |
| 2003/0046587 | A1 * | 3/2003 | Bheemarasetti | H04L 51/222 726/4 |
| 2003/0051139 | A1 * | 3/2003 | Kubota | G06F 21/606 713/168 |
| 2007/0150727 | A1 | 6/2007 | Miyazawa | |
| 2010/0217837 | A1 | 8/2010 | Ansari et al. | |
| 2013/0067552 | A1 | 3/2013 | Hawkes et al. | |
| 2015/0007265 | A1 | 1/2015 | Aissi et al. | |
| 2016/0087797 | A1 * | 3/2016 | Barbir | H04L 9/3226 713/171 |
| 2016/0269392 | A1 | 9/2016 | Arumugam | |
| 2017/0063815 | A1 | 3/2017 | Smith et al. | |
| 2018/0247483 | A1 | 8/2018 | Lindsay | |
| 2020/0228505 | A1 | 7/2020 | Lapidous et al. | |
| 2023/0291550 | A1 * | 9/2023 | Clausen | G06Q 20/40 |
| 2024/0169350 | A1 * | 5/2024 | Fiske | H04L 9/0643 |

OTHER PUBLICATIONS

International Preliminary Report on Patentability received for PCT Application Serial No. PCT/US2020/014180 dated Aug. 5, 2021, 10 pages.

Notice of Allowance received for U.S. Appl. No. 16/743,773 dated Oct. 14, 2021, 48 pages.

Notice of Allowance received for U.S. Appl. No. 17/528,904 dated Jun. 20, 2023, 56 pages.

* cited by examiner

MULTIPLE SENTINELS FOR SECURING COMMUNICATIONS

CROSS-REFERENCE TO RELATED APPLICATION

This application is a continuation of U.S. patent application Ser. No. 17/528,904 filed Nov. 17, 2021, and entitled "MULTIPLE SENTINELS FOR SECURING COMMUNICATIONS," which is a continuation of U.S. patent application Ser. No. 16/743,773, filed Jan. 15, 2020, and entitled "MULTIPLE SENTINELS FOR SECURING COMMUNICATIONS," which claims priority to U.S. Provisional Patent Application. No. 62/796,137, filed Jan. 24, 2019, and entitled "MULTIPLE SENTINELS FOR SECURING COMMUNICATIONS." The entirety of the aforementioned applications is hereby incorporated by reference herein.

TECHNICAL FIELD

The subject disclosure relates generally to communication networks, and more specifically, to communication network security.

BACKGROUND

Network-connected devices such as, for example, internet of things (IoT) devices, are becoming increasingly common. However, often times one or more components embedded into a network-connected device can be discoverable by a hacker and/or can be susceptible to a cyber-attack. For example, one or more components embedded into a network-connected device can be susceptible to a distributed denial-of-service attack. As such, security for network-connected devices can be improved.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate multiple sentinels for securing communications are described.

According to an embodiment, a system can comprise a communication component and a security component. The communication component communicates with at least one multi-purpose device configured to communicate with one or more sources, at least one computing device configured to communicate with a defined source that is different than the one or more sources, and at least one security sentinel that manages one or more security processes for a communication network associated with the at least one multi-purpose device and the at least one computing device. The security component manages one or more other security processes for the communication network associated with the at least one multi-purpose device and the at least one computing device.

According to another embodiment, a computer-implemented method is provided. The computer-implemented method comprises communicating, by a system operatively coupled to a processor, with at least one multi-purpose device configured to communicate with one or more sources and at least one computing device configured to communicate with a defined source that is different than the one or more sources. The computer-implemented method also comprises communicating, by the system, with at least one security sentinel that manages one or more security processes for a communication network associated with the at least one multi-purpose device and the at least one computing device. Furthermore, the computer-implemented method comprises managing, by the system, one or more other security processes for the communication network associated with the at least one multi-purpose device and the at least one computing device.

According to yet another embodiment, a computer readable storage device is provided. The computer readable storage device comprises instructions that, in response to execution, cause a system comprising a processor to perform operations, comprising communicating with at least one multi-purpose device configured to communicate with one or more sources and at least one computing device configured to communicate with a defined source that is different than the one or more sources, communicating with at least one security sentinel that manages one or more security processes for a communication network associated with the at least one multi-purpose device and the at least one computing device, and managing one or more other security processes for the communication network associated with the at least one multi-purpose device and the at least one computing device.

DETAILED DESCRIPTION

Figure 1:
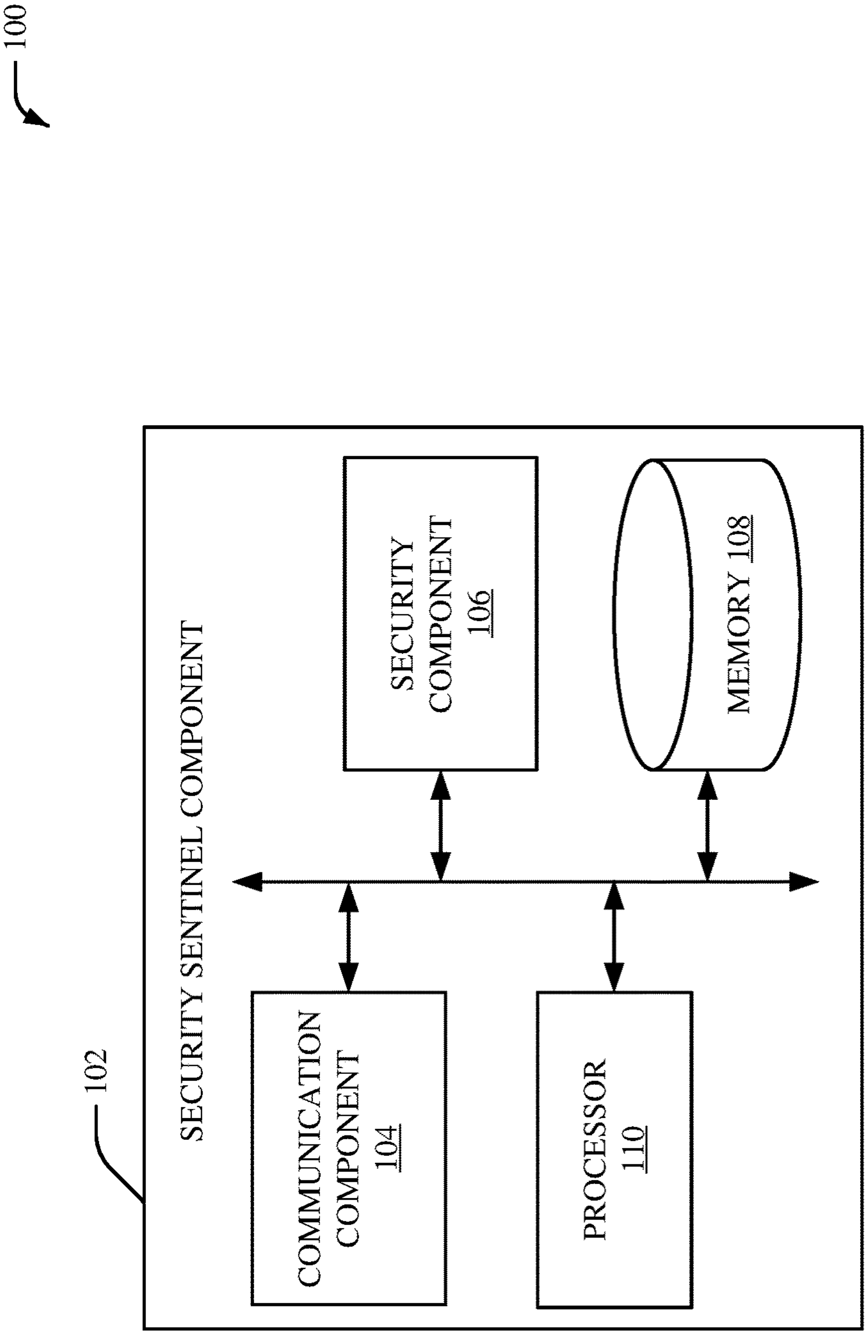
FIG. 1 illustrates a block diagram of an example, non-limiting system that includes a security sentinel component in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Network-connected devices such as, for example, internet of things (IoT) devices, are becoming increasingly common. However, often times one or more components embedded into a network-connected device can be discoverable by a hacker and/or can be susceptible to a cyber-attack. For example, one or more components embedded into a network-connected device can be susceptible to a distributed denial-of-service attack. As such, security for network-connected devices can be improved.

To address these and/or other issues, embodiments described herein include systems, computer-implemented methods, and computer program products that facilitate multiple sentinels for securing communications and improving upon the efficiency of prior systems in manners that are not well-understood, routine, or conventional. For example, one or more cyber-attacks can be mitigated by employing multiple sentinels for securing communications, as more fully disclosed herein. Additionally or alternatively, scalability of one or more cyber-attacks and/or cross-contamination of one or more cyber-attacks can be prevented by employing multiple sentinels for securing communications, as more fully disclosed herein. A security sentinel employed for securing communications can be a system or a device configured to secure the system or the device within a particular network. Multiple security sentinels can provide secure usage and/or operation of one or more devices susceptible to a cyber-attack as part of a particular network. A device susceptible to a cyber-attack can be, for example, a multi-purpose device, a computing device such as a IoT device, etc. In an aspect, functionality of a security sentinel can be hidden and/or physically separated from the one or more devices susceptible to a cyber-attack. As such, a potential hacking exposure for the one or more devices susceptible to a cyber-attack can be avoided. In another aspect, at least two security sentinels can, for example, perform one or more security process in parallel. Furthermore, at least two security sentinels can be present within a particular network. Additionally or alternatively, at least two security sentinel can be gateways to one or more interactions among one or more devices and/or one or more systems within a particular network.

In an embodiment, a security sentinel can generate, synchronize and/or manage one or more passwords for one or more devices and/or one or more systems within a particular network. For instance, a device and/or a system within a particular network can be assigned a unique password that can be modified dynamically. In an example, a particular password for a device and/or a system within a particular network can be employed once and replace with a new password after employing the particular password. In another embodiment, a security sentinel can execute a handshaking communication protocol associated with a device and/or a system within a particular network. The handshaking communication protocol can include generation of an encrypted derivative of a password for a device and/or a system within a particular network. Furthermore, the handshaking communication protocol can provide secure synchronization of passwords and/or encryption parameters. The handshaking communication protocol can also serve an additional security measure such as, for example, an early detection mechanism for a device and/or a system within a particular network. In yet another embodiment, a security sentinel can manage an encryption algorithm employed to generate an encrypted derivative of a password for a device and/or a system within a particular network. In a non-limiting example, the encryption algorithm can be associated with an Advanced Encryption Standard. However, it is to be appreciated that a different type of encryption algorithm can be employed. In an aspect, one or more encryption parameters for the encryption algorithm can be dynamically altered. For example, a particular encryption parameter for the encryption algorithm can be employed once and replaced with a different encryption parameter after the particular encryption parameter is employed. As such, one or more cyber-attacks can be mitigated by employing two or more security sentinels. Furthermore, scalability of one or more cyber-attacks and/or cross-contamination of one or more cyber-attacks can be prevented by employing two or more security sentinels. Moreover, performance of a device and/or a system within a particular network can be improved.

With reference now to the drawings, FIG. 1 illustrates a block diagram of an example, non-limiting system 100 that facilitates multiple sentinels for securing communications in accordance with one or more embodiments described herein. In various embodiments, the system 100 can be a security sentinel system associated with technologies such as, but not limited to, network technologies, communication network technologies, multi-purpose device technologies, computing device technologies, internet of things (IoT) technologies, automated teller machine technologies, smart device technologies, smart lightbulb technologies, smart refrigerator technologies, smart doorbell technologies, smart thermostat technologies, home automation technologies, medical device technologies, wearable device technologies, manufacturing technologies, energy management technologies, automotive technologies, sensor technologies, microcontroller technologies, security technologies, communication protocol technologies, encryption technologies, access point technologies, router technologies, machine learning technologies, artificial intelligence technologies, digital technologies, analog technologies, computer technologies, server technologies, and/or other technologies. The system 100 can employ hardware and/or software to solve problems that are highly technical in nature, that are not abstract and that cannot be performed as a set of mental acts by a human. Further, some of the processes performed may be performed by one or more specialized computers (e.g., one or more specialized processors, one or more specialized processing units, a specialized computer with a security sentinel component, etc.) for carrying out defined tasks related to communication security, handshaking communication protocols, and/or one or more other types of tasks. The system 100 and/or components of the system can be employed to solve new problems that arise through advancements in technologies mentioned above and/or computer architecture, and the like. One or more embodiments of the system 100 can provide technical improvements to a system associated with technologies such as, but not limited to, network systems, communication network systems, multi-purpose device systems, computing device systems, IoT systems, automated teller machine systems, smart device systems, smart lightbulb systems, smart refrigerator systems, smart doorbell systems, smart thermostat systems, home automation systems, medical device systems, wearable device systems, manufacturing systems, energy management systems, automotive systems, sensor systems, microcontroller systems, security systems, communication protocol systems, encryption systems, access point systems, router systems, machine learning systems, artificial intelligence systems, digital systems, analog systems, computer systems, server systems, and/or one or more other systems.

In the embodiment shown in FIG. 1, the system 100 can include a security sentinel component 102. As shown in FIG. 1, the security sentinel component 102 can include a communication component 104 and a security component 106. Aspects of the security sentinel component 102 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the security sentinel component 102 can also include memory 108 that stores computer executable components and instructions. Furthermore, the security sentinel component 102 can include a processor 110 to facilitate execution of the instructions (e.g., computer executable components and corresponding instructions) by the security sentinel component 102. As shown, the communication component 104, the security component 106, the memory 108 and/or the processor 110 can be electrically and/or communicatively coupled to one another in one or more embodiments. In an embodiment, the security sentinel component 102 can be included in a security sentinel. In certain embodiments, the security sentinel component 102 can be coupled to a network device such as, for example, a router device, an access point device, a server device, or another type of network device. In certain embodiments, the security sentinel component 102 can be embedded into a network device such as, for example, a router device, an access point device, a server device or another type of network device.

The security sentinel component 102 can be configured as a gateway for one or more interactions associated with at least one multi-purpose device and/or at least one computing device in a communication network. The communication network can be, for example, a wireless network and/or a wired network. For example, the communication network can be a wide area network (WAN) such as the Internet, a local area network (LAN), a cellular network, and/or another type of communication network. In an aspect, the communication component 104 can communicate with the at least one multi-purpose device, the at least one computing device and/or at least one security sentinel. The at least one multi-purpose device can be configured to communicate with one or more sources. For instance, the at least one multi-purpose device can be configured to operate in one or more network security frameworks. In an aspect, the at least one multi-purpose device can access the communication network. The at least one multi-purpose device can also transmit data and/or receive data via the communication network. In another aspect, the at least one multi-purpose device can respond to one or more communication exchanges from the one or more sources. One or more portions of the at least one multi-purpose device can also be modified and/or updated by the one or more sources. In an example, the at least one multi-purpose device can include one or more smartphones, one or more mobile devices, one or more tablet computers, one or more laptop computers, one or more personal computers, one or more television devices, one or more appliance devices, one or more wearable devices, one or more portable electronic devices, one or more electronic devices associated with a display, and/or one or more other devices. In an embodiment, the at least one multi-purpose device can be located in the communication network between the security sentinel component 102 and the at least one security sentinel. In another embodiment, the at least one multi-purpose device can interact with the at least one computing device, one or more other multi-purpose devices and/or one or more devices in the communication network after being authenticated and/or validated by the security sentinel component 102 and the at least one security sentinel.

The at least one computing device can be configured to communicate with a defined source that is different than the one or more sources. For instance, the at least one computing device can be a remotely accessible device or system. Furthermore, the at least one computing device can be configured to perform one or more download processes that receive one or more updates and/or one or more modifications for the at least one computing device from a defined source. The defined source can be, for example, a secure central command center and/or another defined source. The at least one computing device can additionally or alternatively be configured to receive one or more commands from a defined source such as, for example, the at least one security sentinel. The at least one computing device can include, for example, one or more IoT devices, one or more slave device, one or more slave systems, one or more slave application, and/or one or more other computing devices. In an embodiment, the at least one computing device can be located in the communication network between the system and the at least one security sentinel. Additionally or alternatively, the at least one computing device can be located at a different location in the communication network (e.g., the at least one security sentinel and/or the system can be located between the at least one computing device and the at least one multi-purpose device). The at least one security sentinel can manage one or more security processes for the communication network associated with the at least one multi-purpose device and/or the at least one computing device. For example, the at least one security sentinel can manage and/or generate one or more commands associated with security for the at least one multi-purpose device and/or the at least one computing device. In an embodiment, the at least one security sentinel and the security sentinel component 102 can be implemented on the same hardware. In another embodiment, the at least one security sentinel and the security sentinel component 102 can be implemented on different hardware, including configurations in which each security sentinel is implemented on hardware separate from every other security sentinel in the system.

The security component 106 can manage one or more other security processes for the communication network associated with the at least one multi-purpose device and the at least one computing device. For instance, the security component 106 can manage one or more other security processes that are different than the one or more security processes managed by the at least one security sentinel. In an embodiment, the security component 106 can generate, synchronize and/or manage one or more passwords for the at least one multi-purpose device and/or the at least one computing device. For instance, the security component 106 can assign a unique password to the at least one multi-purpose device and/or the at least one computing device. The unique password assigned to the at least one multi-purpose device and/or the at least one computing device can be modified dynamically by the security component 106. In an example, the security component 106 can generate a particular password for the at least one multi-purpose device and/or the at least one computing device. The particular password for the at least one multi-purpose device and/or the at least one computing device can be employed once by the at least one multi-purpose device and/or the at least one computing device. Furthermore, in response to a determination that the at least one multi-purpose device and/or the at least one computing device has employed the particular password, the security component 106 can generate a new password for the at least one multi-purpose device and/or the at least one computing device. The new password can be different than the particular password employed by the at least one multi-purpose device and/or the at least one computing device.

In another embodiment, the security component 106 can execute a handshaking communication protocol associated with the at least one multi-purpose device and/or the at least one computing device. The handshaking communication protocol executed by the security component 106 can include generation of an encrypted derivative of a password for the at least one multi-purpose device and/or the at least one computing device. Furthermore, the handshaking communication protocol executed by the security component 106 can provide secure synchronization of passwords and/or encryption parameters. The handshaking communication protocol executed by the security component 106 can also serve an additional security measure such as, for example, an early detection mechanism for the at least one multi-purpose device and/or the at least one computing device.

In yet another embodiment, the security component 106 can manage an encryption algorithm employed to generate an encrypted derivative of a password for the at least one multi-purpose device and/or the at least one computing device. In a non-limiting example, the encryption algorithm managed by the security component 106 can be associated with an Advanced Encryption Standard. However, it is to be appreciated that a different type of encryption algorithm can be employed by the security component 106. In an aspect, the security component 106 can dynamically alter one or more encryption parameters for the encryption algorithm. For example, the security component 106 can employ a particular encryption parameter for the encryption algorithm once. The security component 106 can also replace the particular encryption parameter for the encryption algorithm with a different encryption parameter after the particular encryption parameter is employed by the encryption algorithm.

Figure 2:
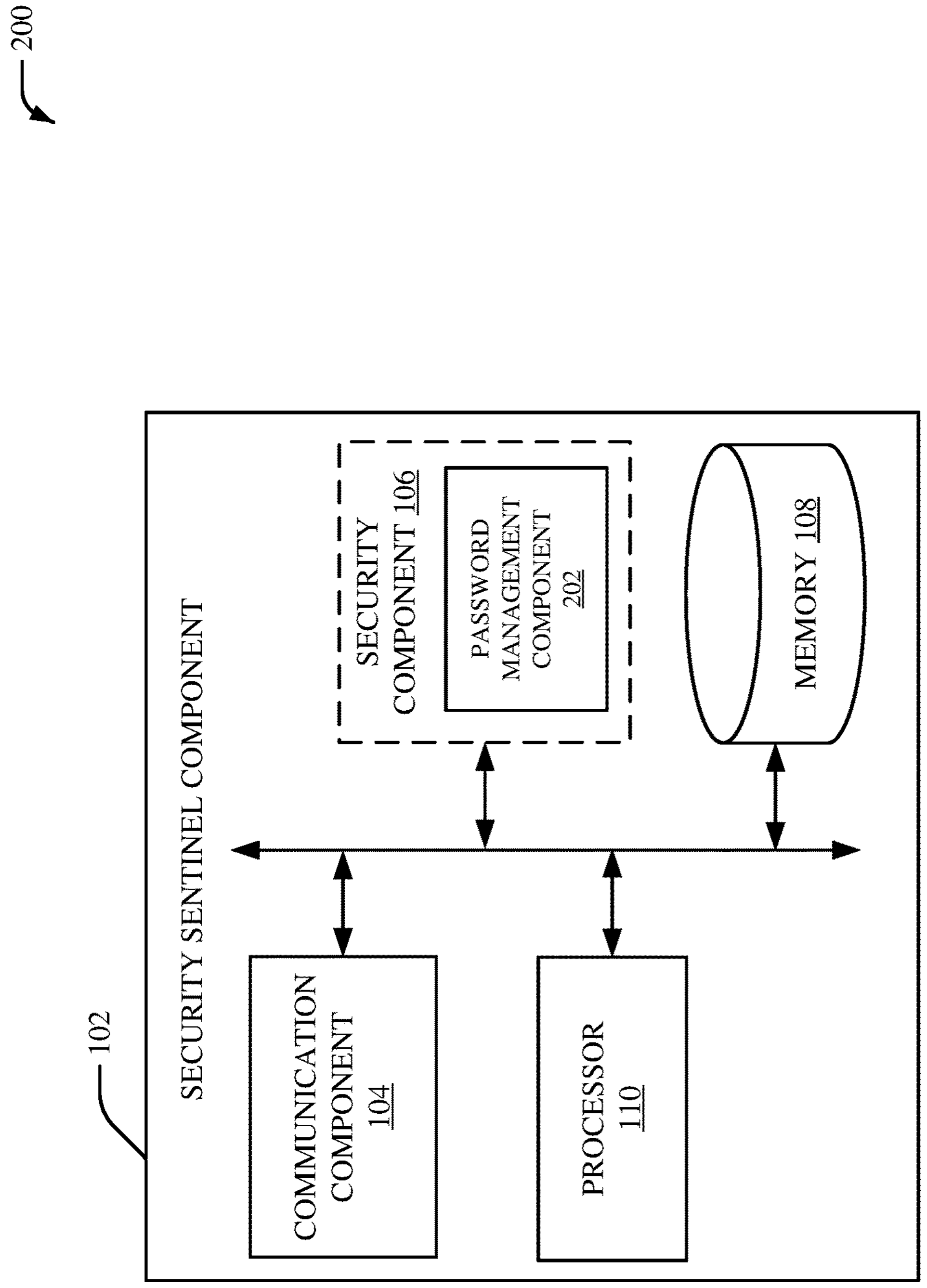
FIG. 2 illustrates a block diagram of another example, non-limiting system that includes a security sentinel component in accordance with one or more embodiments described herein.

FIG. 2 illustrates a block diagram of an example, non-limiting system 200 in accordance with one or more embodiments described herein. Repetitive description of like elements employed in other embodiments described herein is omitted for sake of brevity.

The system 200 includes the security sentinel component 102. The security sentinel component 102 can include the communication component 104, the security component 106, the memory 108 and/or the processor 110. In the embodiment shown in FIG. 2, the security component 106 can include a password management component 202. In an embodiment, the password management component 202 can generate, synchronize and/or manage one or more passwords for the at least one multi-purpose device and/or the at least one computing device. For instance, the password management component 202 can assign a unique password to the at least one multi-purpose device and/or the at least one computing device. The unique password assigned to the at least one multi-purpose device and/or the at least one computing device can be modified dynamically by the password management component 202. In certain embodiments, the password management component 202 can randomly generate the one or more passwords for the at least one multi-purpose device and/or the at least one computing device. The password management component 202 can employ one or more random number generators and/or one or more random number generation techniques to randomly generate the one or more passwords for the at least one multi-purpose device and/or the at least one computing device.

In an aspect, the password management component 202 can repeatedly generate password data for the at least one multi-purpose device and/or the at least one computing device over a defined period of time. For instance, the password management component 202 can repeatedly generate a different password for the at least one multi-purpose device and/or the at least one computing device over a defined period of time. In another aspect, the password management component 202 can randomly generate a new password for the at least one multi-purpose device and/or the at least one computing device in response to a determination that a password is employed by the at least one multi-purpose device and/or the at least one computing device during an authentication process for the at least one multi-purpose device and/or the at least one computing device. In an example, the password management component 202 can generate a particular password for the at least one multi-purpose device and/or the at least one computing device. The particular password for the at least one multi-purpose device and/or the at least one computing device can be employed once by the at least one multi-purpose device and/or the at least one computing device. In certain embodiments, the password management component 202 can randomly generate the particular password. The password management component 202 can employ one or more random number generators and/or one or more random number generation techniques to randomly generate the particular password. Furthermore, in response to a determination that the at least one multi-purpose device and/or the at least one computing device has employed the particular password, the password management component 202 can generate a new password for the at least one multi-purpose device and/or the at least one computing device. The new password can be different than the particular password employed by the at least one multi-purpose device and/or the at least one computing device. In certain embodiments, the password management component 202 can randomly generate the new password. The password management component 202 can employ one or more random number generators and/or one or more random number generation techniques to randomly generate the new password. In certain embodiments, the at least one security sentinel can alternatively generate the new password for the at least one multi-purpose device and/or the at least one computing device. In certain embodiments, the password management component 202 can repeatedly generate first password data for the at least one computing device over a defined period of time. Furthermore, the password management component 202 can repeatedly generate second password data for the at least one multi-purpose device over a defined period of time. The password management component 202 can randomly generate a first new password for the at least one computing device in response to a determination that a password included in the first password data is employed by the at least one computing device during an authentication process for the at least one computing device and/or the at least one multi-purpose device. Furthermore, the password management component 202 can randomly generate a second new password for the at least one multi-purpose device in response to a determination that a password included in the second password data is employed by the at least one multi-purpose device during an authentication process for the at least one multi-purpose device and/or the at least one computing device.

In another embodiment, the password management component 202 can communicate with the at least one security sentinel to facilitate generation, synchronization and/or management of one or more passwords for the at least one multi-purpose device and/or the at least one computing device. For example, the password management component 202 can collaborate with the at least one security sentinel to generate, synchronize and/or manage one or more passwords for the at least one multi-purpose device and/or the at least one computing device. In an aspect, the password management component 202 can provide data associated with generation, synchronization and/or management of one or more passwords to the at least one security sentinel. In another aspect, the password management component 202 can receive data associated with generation, synchronization and/or management of one or more passwords from the at least one security sentinel.

In yet another embodiment, the password management component 202 can employ machine learning and/or principles of artificial intelligence (e.g., a machine learning process) to generate, synchronize and/or manage one or more passwords for the at least one multi-purpose device and/or the at least one computing device. For example, the password management component 202 can employ machine learning and/or principles of artificial intelligence (e.g., a machine learning process) to generate, synchronize and/or manage one or more passwords for the at least one multi-purpose device and/or the at least one computing device. The password management component 202 can employ any suitable machine-learning based techniques, statistical-based techniques and/or probabilistic-based techniques. For example, the password management component 202 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the password management component 202 can perform a set of machine learning computations to generate, synchronize and/or manage one or more passwords for the at least one multi-purpose device and/or the at least one computing device. For example, the password management component 202 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to generate, synchronize and/or manage one or more passwords for the at least one multi-purpose device and/or the at least one computing device.

Figure 3:
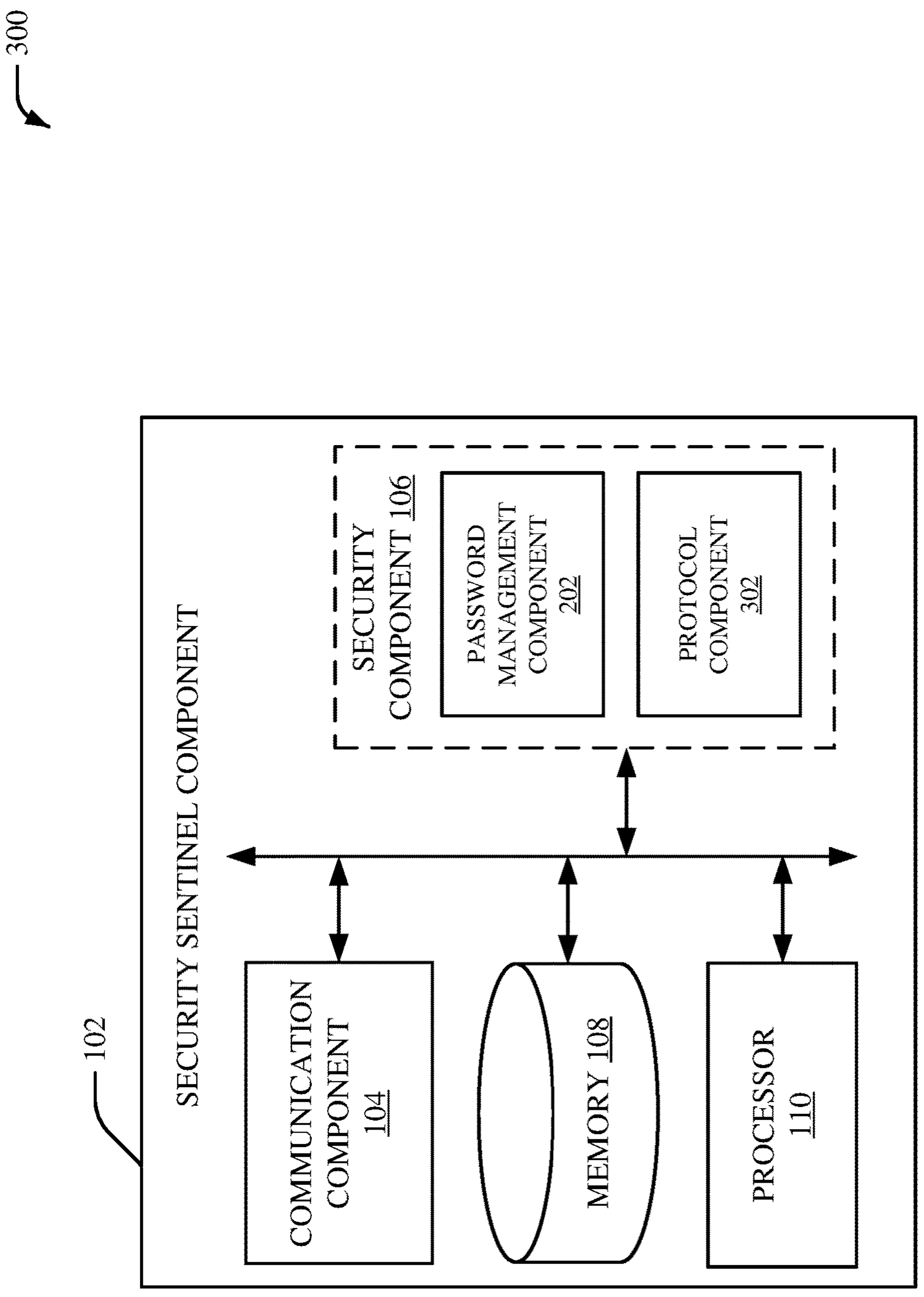
FIG. 3 illustrates a block diagram of yet another example, non-limiting system that includes a security sentinel component in accordance with one or more embodiments described herein.

FIG. 3 illustrates a block diagram of an example, non-limiting system 300 in accordance with one or more embodiments described herein. Repetitive description of like elements employed in other embodiments described herein is omitted for sake of brevity.

The system 300 includes the security sentinel component 102. The security sentinel component 102 can include the communication component 104, the security component 106, the memory 108 and/or the processor 110. In the embodiment shown in FIG. 3, the security component 106 can include the password management component 202 and/or a protocol component 302. In an embodiment, the protocol component 302 can execute a handshaking communication protocol associated with the at least one multi-purpose device and/or the at least one computing device. The handshaking communication protocol executed by the protocol component 302 can include generation of an encrypted derivative of a password for the at least one multi-purpose device and/or the at least one computing device. For instance, the protocol component 302 can generate an encrypted version of the one or more passwords generated by the password management component 202 for the at least one multi-purpose device and/or the at least one computing device. In an aspect, the protocol component 302 can execute a handshaking communication protocol process with the at least one multi-purpose device and/or the at least one computing device where the handshaking communication protocol process comprises generation of an encrypted version of the password data generated by the password management component 202 for the at least one multi-purpose device and/or the at least one computing device. In an example, the protocol component 302 can generate an encrypted version of the particular password and/or the new password generated by the password management component 202 for the at least one multi-purpose device and/or the at least one computing device. The protocol component 302 can employ one or more encryption techniques and/or one or more encryption algorithms to generate an encrypted derivative of a password for the at least one multi-purpose device and/or the at least one computing device. Furthermore, the handshaking communication protocol executed by the protocol component 302 can provide secure synchronization of passwords and/or encryption parameters for the at least one multi-purpose device and/or the at least one computing device. The handshaking communication protocol executed by the protocol component 302 can also serve an additional security measure such as, for example, an early detection mechanism for the at least one multi-purpose device and/or the at least one computing device. In certain embodiments, the protocol component 302 can execute a first handshaking communication protocol process with the at least one computing device to generate an encrypted version of the first password data generated by the password management component 202 for the at least one computing device. Furthermore, the protocol component 302 can execute a second handshaking communication protocol process with the at least one multi-purpose device to generate an encrypted version of the second password data generated by the password management component 202 for the at least one multi-purpose device.

In another embodiment, the protocol component 302 can communicate with the at least one security sentinel to facilitate executing a handshaking communication protocol. For example, the protocol component 302 can collaborate with the at least one security sentinel to execute a handshaking communication protocol associated with the at least one multi-purpose device and/or the at least one computing device. In an aspect, the protocol component 302 can provide data associated with a handshaking communication protocol for the at least one multi-purpose device and/or the at least one computing device to the at least one security sentinel. In another aspect, the protocol component 302 can receive data associated with a handshaking communication protocol for the at least one multi-purpose device and/or the at least one computing device to the at least one security sentinel from the at least one security sentinel. Additionally or alternatively, the protocol component 302 can communicate with the at least one security sentinel to facilitate generating an encrypted derivative of a password. For example, the protocol component 302 can collaborate with the at least one security sentinel to generate an encrypted derivative of a password for the at least one multi-purpose device and/or the at least one computing device. In an aspect, the protocol component 302 can provide data associated with generating an encrypted derivative of a password to the at least one security sentinel. In another aspect, the protocol component 302 can receive data associated with generating an encrypted derivative of a password to the at least one security sentinel from the at least one security sentinel.

In yet another embodiment, the protocol component 302 can employ machine learning and/or principles of artificial intelligence (e.g., a machine learning process) to execute a handshaking communication protocol associated with the at least one multi-purpose device and/or the at least one computing device. For example, the protocol component 302 can employ machine learning and/or principles of artificial intelligence (e.g., a machine learning process) to execute a handshaking communication protocol associated with the at least one multi-purpose device and/or the at least one computing device. The protocol component 302 can employ any suitable machine-learning based techniques, statistical-based techniques and/or probabilistic-based techniques. For example, the protocol component 302 can employ expert systems, fuzzy logic, SVMs, HMMs, greedy search algorithms, rule-based systems, Bayesian models (e.g., Bayesian networks), neural networks, other non-linear training techniques, data fusion, utility-based analytical systems, systems employing Bayesian models, etc. In another aspect, the protocol component 302 can perform a set of machine learning computations to execute a handshaking communication protocol associated with the at least one multi-purpose device and/or the at least one computing device. For example, the protocol component 302 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to execute a handshaking communication protocol associated with the at least one multi-purpose device and/or the at least one computing device.

Additionally or alternatively, the protocol component 302 can employ machine learning and/or principles of artificial intelligence (e.g., a machine learning process) to generate an encrypted derivative of a password for the at least one multi-purpose device and/or the at least one computing device. For example, the protocol component 302 can employ machine learning and/or principles of artificial intelligence (e.g., a machine learning process) to generate an encrypted derivative of a password for the at least one multi-purpose device and/or the at least one computing device. The protocol component 302 can employ any suitable machine-learning based techniques, statistical-based techniques and/or probabilistic-based techniques. For example, the protocol component 302 can employ expert systems, fuzzy logic, SVMs, HMMs, greedy search algorithms, rule-based systems, Bayesian models (e.g., Bayesian networks), neural networks, other non-linear training techniques, data fusion, utility-based analytical systems, systems employing Bayesian models, etc. In another aspect, the protocol component 302 can perform a set of machine learning computations to generate an encrypted derivative of a password for the at least one multi-purpose device and/or the at least one computing device. For example, the protocol component 302 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to generate an encrypted derivative of a password for the at least one multi-purpose device and/or the at least one computing device.

Figure 4:
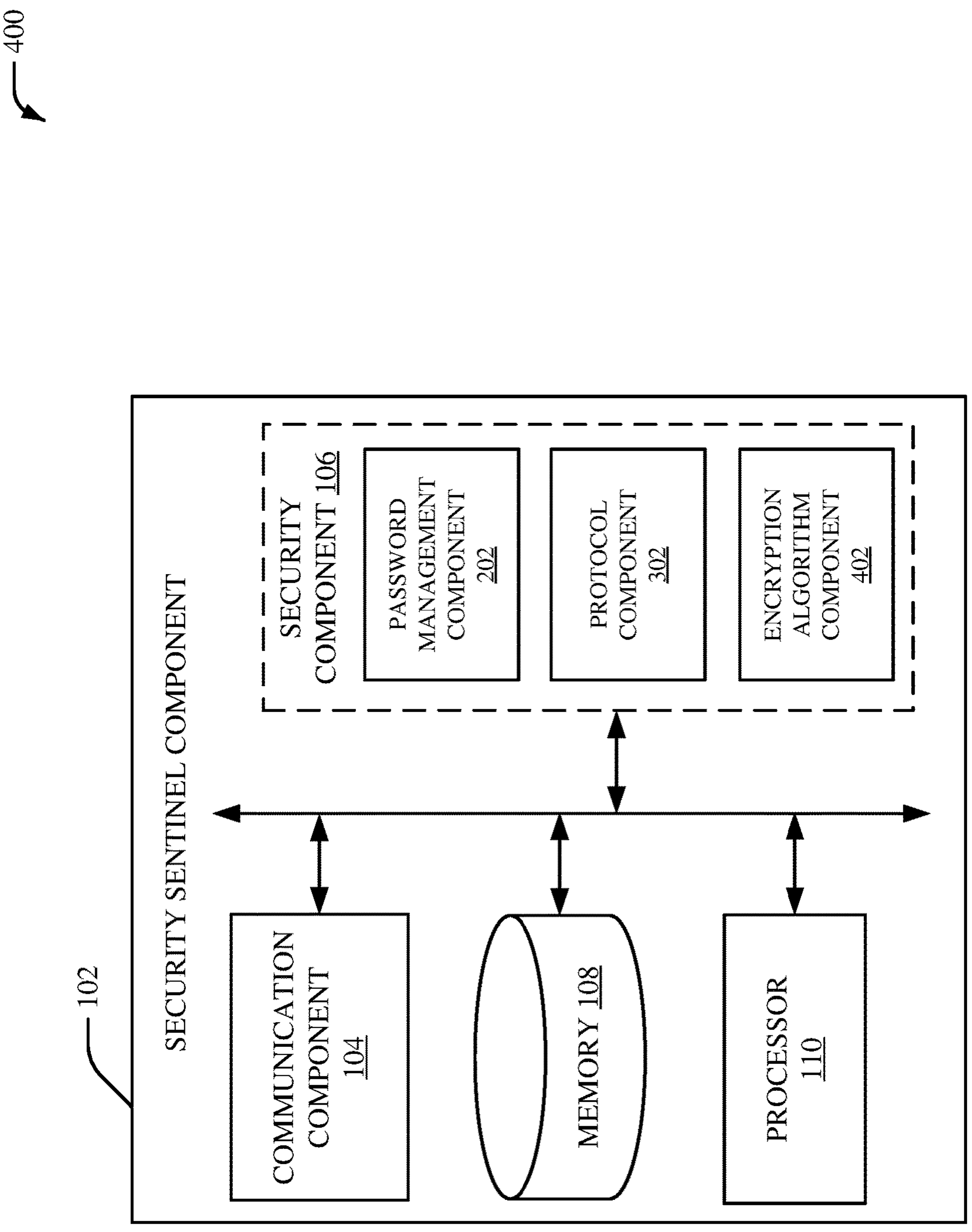
FIG. 4 illustrates a block diagram of yet another example, non-limiting system that includes a security sentinel component in accordance with one or more embodiments described herein.

FIG. 4 illustrates a block diagram of an example, non-limiting system 400 in accordance with one or more embodiments described herein. Repetitive description of like elements employed in other embodiments described herein is omitted for sake of brevity.

The system 400 includes the security sentinel component 102. The security sentinel component 102 can include the communication component 104, the security component 106, the memory 108 and/or the processor 110. In the embodiment shown in FIG. 4, the security component 106 can include the password management component 202, the protocol component 302 and/or an encryption algorithm component 402. In an embodiment, the encryption algorithm component 402 can manage one or more encryption techniques and/or one or more encryption algorithms employed by the protocol component 302 to generate an encrypted derivative of a password for the at least one multi-purpose device and/or the at least one computing device. In a non-limiting example, the one or more encryption techniques and/or one or more encryption algorithms managed by the encryption algorithm component 402 can be associated with an Advanced Encryption Standard. However, it is to be appreciated that a different type of encryption technique and/or a different type of encryption algorithm can be employed by the encryption algorithm component 402. In an aspect, the encryption algorithm component 402 can dynamically alter one or more encryption parameters for the one or more encryption techniques and/or one or more encryption algorithms employed by the protocol component 302. For instance, the encryption algorithm component 402 can manage one or more encryption techniques and/or one or more encryption algorithms employed by the protocol component 302 to generate an encrypted derivative of a password for the at least one multi-purpose device and/or the at least one computing device. The encryption algorithm component 402 can, for example, repeatedly generate encryption parameter data for the one or more encryption techniques and/or one or more encryption algorithms over the defined period of time. In an example, the encryption algorithm component 402 can provide a particular encryption parameter to the protocol component 302 for a particular encryption technique and/or a particular encryption algorithm once. The encryption algorithm component 402 can also replace the particular encryption parameter for the particular encryption technique and/or the particular encryption algorithm with a different encryption parameter after the particular encryption parameter is employed by the encryption algorithm associated with the protocol component 302. For example, the encryption algorithm component 402 can provide the different encryption parameter to the protocol component 302 in response to a determination that the particular encryption parameter is employed once by the particular encryption technique and/or the particular encryption algorithm associated with the protocol component 302. In certain embodiments, the encryption algorithm component 402 can manage a first encryption technique and/or a first encryption algorithm employed to generate the encrypted version of the first password data for the at least one computing device. The encryption algorithm component 402 can repeatedly generate first encryption parameter data for the first encryption technique and/or the first encryption algorithm over the defined period of time. Furthermore, the encryption algorithm component 402 can manage a second encryption technique and/or a second encryption algorithm employed to generate the encrypted version of the second password data for the at least one multi-purpose device. The encryption algorithm component 402 can repeatedly generate second encryption parameter data for the second encryption technique and/or the second encryption algorithm over the defined period of time.

In another embodiment, the encryption algorithm component 402 can communicate with the at least one security sentinel to facilitate managing one or more encryption techniques and/or one or more encryption algorithms employed by the protocol component 302. For example, the encryption algorithm component 402 can collaborate with the at least one security sentinel to manage one or more encryption techniques and/or one or more encryption algorithms employed by the protocol component 302 to generate an encrypted derivative of a password for the at least one multi-purpose device and/or the at least one computing device. In an aspect, the encryption algorithm component 402 can provide data associated with one or more encryption techniques and/or one or more encryption algorithms employed by the protocol component 302 to the at least one security sentinel. In another aspect, the encryption algorithm component 402 can receive data associated with one or more encryption techniques and/or one or more encryption algorithms employed by the protocol component 302 from the at least one security sentinel.

In yet another embodiment, the encryption algorithm component 402 can employ machine learning and/or principles of artificial intelligence (e.g., a machine learning process) to manage one or more encryption techniques and/or one or more encryption algorithms employed by the protocol component 302 to generate an encrypted derivative of a password for the at least one multi-purpose device and/or the at least one computing device. For example, the encryption algorithm component 402 can employ machine learning and/or principles of artificial intelligence (e.g., a machine learning process) to manage one or more encryption techniques and/or one or more encryption algorithms employed by the protocol component 302 to generate an encrypted derivative of a password for the at least one multi-purpose device and/or the at least one computing device. The encryption algorithm component 402 can employ any suitable machine-learning based techniques, statistical-based techniques and/or probabilistic-based techniques. For example, the encryption algorithm component 402 can employ expert systems, fuzzy logic, SVMs, HMMs, greedy search algorithms, rule-based systems, Bayesian models (e.g., Bayesian networks), neural networks, other non-linear training techniques, data fusion, utility-based analytical systems, systems employing Bayesian models, etc. In another aspect, the encryption algorithm component 402 can perform a set of machine learning computations to manage one or more encryption techniques and/or one or more encryption algorithms employed by the protocol component 302 to generate an encrypted derivative of a password for the at least one multi-purpose device and/or the at least one computing device. For example, the encryption algorithm component 402 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to manage one or more encryption techniques and/or one or more encryption algorithms employed by the protocol component 302 to generate an encrypted derivative of a password for the at least one multi-purpose device and/or the at least one computing device.

Figure 5:
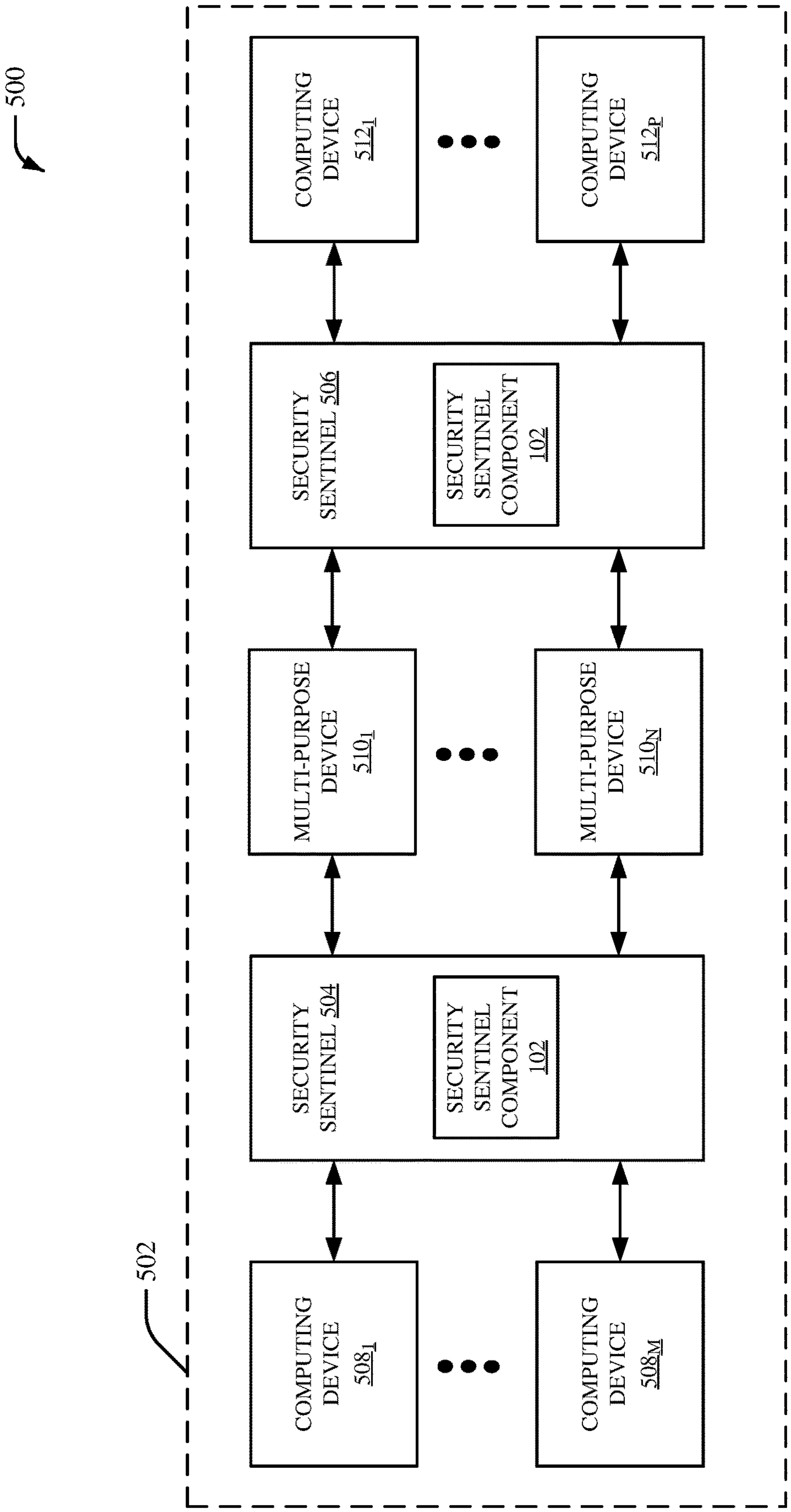
FIG. 5 illustrates an example, non-limiting system that includes a communication network in accordance with one or more embodiments described herein.

FIG. 5 illustrates a block diagram of an example, non-limiting system 500 in accordance with one or more embodiments described herein. Repetitive description of like elements employed in other embodiments described herein is omitted for sake of brevity.

The system 500 includes a communication network 502. The communication network 502 can be, for example, a wireless network and/or a wired network. For example, the communication network 502 can be a WAN (e.g., a portion of the Internet), a LAN, a cellular network, a Bluetooth network, an IEEE 802.11 network, and/or another type of communication network, including a mixed network comprising two or more different types of networks. The communication network 502 can include at least a security sentinel 504 and a security sentinel 506. However, it is to be appreciated that the communication network 502 can include more than two security sentinels. The communication network 502 can also include at least one multi-purpose device and/or at least one computing device. For instance, in the embodiment shown in FIG. 5, the communication network 502 can include a set of computing devices $\mathbf{508}_{1\text{-}M}$, a set of multi-purpose devices $\mathbf{510}_{1\text{-}N}$, and/or a set of computing devices $\mathbf{512}_{1\text{-}P}$, where M, N and P are integers. The set of computing devices $\mathbf{508}_{1\text{-}M}$ can include one or more computing devices such as, for example, one or more IoT devices, one or more slave device, one or more slave systems, one or more slave application, and/or one or more other computing devices. The set of multi-purpose devices $\mathbf{510}_{1\text{-}N}$ can include one or more smartphones, one or more mobile devices, one or more tablet computers, one or more laptop computers, one or more personal computers, one or more television devices, one or more appliance devices, one or more wearable devices, one or more portable electronic devices, one or more electronic devices associated with a display, and/or one or more other devices. Furthermore, the set of computing devices $\mathbf{512}_{1\text{-}P}$ can include one or more computing devices such as, for example, one or more IoT devices, one or more slave device, one or more slave systems, one or more slave application, and/or one or more other computing devices. In an example, the set of computing devices $\mathbf{508}_{1\text{-}M}$, the set of multi-purpose devices $\mathbf{510}_{1\text{-}N}$, and/or the set of computing devices $\mathbf{512}_{1\text{-}P}$ can be the at least one multi-purpose device and/or the at least one computing device in communication with the security sentinel component 102 disclosed herein in connection with FIG. 1, FIG. 2, FIG. 3 and/or FIG. 4.

In an embodiment, the security sentinel 504 can include the security sentinel component 102 disclosed herein in connection with FIG. 1, FIG. 2, FIG. 3 and/or FIG. 4. Additionally or alternatively, the security sentinel 506 can include the security sentinel component 102 disclosed herein in connection with FIG. 1, FIG. 2, FIG. 3 and/or FIG. 4. For example, the security sentinel component 102 included in the security sentinel 504 can correspond to the security sentinel component 102 disclosed herein in connection with FIG. 1, FIG. 2, FIG. 3 and/or FIG. 4. Furthermore, the security sentinel 506 can correspond to the at least one security sentinel disclosed herein in connection with FIG. 1, FIG. 2, FIG. 3 and/or FIG. 4. In another example, the security sentinel component 102 included in the security sentinel 506 can correspond to the security sentinel component 102 disclosed herein in connection with FIG. 1, FIG. 2, FIG. 3 and/or FIG. 4. Furthermore, the security sentinel 504 can correspond to the at least one security sentinel disclosed herein in connection with FIG. 1, FIG. 2, FIG. 3 and/or FIG. 4. The security sentinel component 102 included in the security sentinel 504 can include the communication component 104, the security component 106, the memory 108, the processor 110, the password management component 202, the protocol component 302 and/or the encryption algorithm component 402 disclosed herein in connection with FIG. 1, FIG. 2, FIG. 3 and/or FIG. 4. Additionally or alternatively, the security sentinel component 102 included in the security sentinel 506 can include the communication component 104, the security component 106, the memory 108, the processor 110, the password management component 202, the protocol component 302 and/or the encryption algorithm component 402 disclosed herein in connection with FIG. 1, FIG. 2, FIG. 3 and/or FIG. 4. The security sentinel 504 can be hardware, software, or a combination of hardware and software. Furthermore, security sentinel 506 can be hardware, software, or a combination of hardware and software. In an embodiment, the security sentinel 504 and the security sentinel 506 can be embedded on the same hardware. In another embodiment, the security sentinel 504 and the security sentinel 506 can be embedded on different hardware. In certain embodiments, the security sentinel 504 and/or the security sentinel 506 can be coupled to a network device such as, for example, a router device, an access point device, a server device, or another type of network device. In certain embodiments, the security sentinel 504 and/or the security sentinel 506 can be embedded into a network device such as, for example, a router device, an access point device, a server device or another type of network device.

The security sentinel 504 and/or the security sentinel 506 can be employed for securing communications within the communication network 502. For instance, the security sentinel 504 and/or the security sentinel 506 can be employed for securing communications associated with the set of computing devices $\mathbf{508}_{1\text{-}M}$, the set of multi-purpose devices $\mathbf{510}_{1\text{-}N}$, and/or the set of computing devices $\mathbf{512}_{1\text{-}P}$. The set of computing devices $\mathbf{508}_{1\text{-}M}$ and/or the set of computing devices $\mathbf{512}_{1\text{-}P}$ can be in communication with one or more defined sources and/or one or more devices outside of the communication network 502 and/or within the communication network 502. In an aspect, the set of computing devices $\mathbf{508}_{1\text{-}M}$ and/or the set of computing devices $\mathbf{512}_{1\text{-}P}$ can perform one or more download processes that receive one or more updates and/or one or more modifications for the set of computing devices $\mathbf{508}_{1\text{-}M}$ and/or the set of computing devices $\mathbf{512}_{1\text{-}P}$ can from the one or more defined sources and/or the one or more devices. The one or more defined sources can be, for example, a secure central command center and/or one or more other defined sources. The set of computing devices $\mathbf{508}_{1\text{-}M}$ and/or the set of computing devices $\mathbf{512}_{1\text{-}P}$ can additionally or alternatively be configured to receive one or more commands from the security sentinel 504 and/or the security sentinel 506. For instance, the set of computing devices $\mathbf{508}_{1\text{-}M}$ can receive one or more commands from the security sentinel 504. Furthermore, the set of computing devices $\mathbf{512}_{1\text{-}P}$ can receive one or more commands from the security sentinel 506.

The set of multi-purpose devices $\mathbf{510}_{1\text{-}N}$ can be configured to communicate with one or more sources and/or one or more devices outside of the communication network 502 and/or within the communication network 502. The set of multi-purpose devices $\mathbf{510}_{1\text{-}N}$ can also be configured to operate in one or more network security frameworks. In an aspect, the set of multi-purpose devices $\mathbf{510}_{1\text{-}N}$ can transmit data and/or receive data via the communication network 502. For example, the set of multi-purpose devices $\mathbf{510}_{1\text{-}N}$ can transmit data to and/or receive data from the one or more sources and/or the one or more devices outside of the communication network 502 and/or within the communication network 502. Additionally or alternatively, the set of multi-purpose devices $\mathbf{510}_{1\text{-}N}$ can transmit data to and/or receive data from the set of computing devices $\mathbf{508}_{1\text{-}M}$ and/or the set of computing devices $\mathbf{512}_{1\text{-}P}$. In another aspect, the set of multi-purpose devices $\mathbf{510}_{1\text{-}N}$ can respond to one or more communication exchanges from the security sentinel 504 and/or the security sentinel 506. One or more portions of the set of multi-purpose devices $\mathbf{510}_{1\text{-}N}$ can also be modified and/or updated by the one or more sources the one or more sources and/or the one or more devices outside of the communication network 502 and/or within the communication network 502. For instance, one or more processing threads and/or computing components for the set of multi-purpose devices $\mathbf{510}_{1\text{-}N}$ can also be modified and/or updated by the one or more sources the one or more sources and/or the one or more devices outside of the communication network 502 and/or within the communication network 502. Additionally or alternatively, one or more portions of the set of multi-purpose devices $\mathbf{510}_{1\text{-}N}$ can also be modified and/or updated by the security sentinel 504 and/or the security sentinel 506. For instance, one or more processing threads and/or computing components for the set of multi-purpose devices $\mathbf{510}_{1\text{-}N}$ can also be modified and/or updated by the security sentinel 504 and/or the security sentinel 506.

In an embodiment, the security sentinel 504 and the security sentinel 506 can be configured as gateways for one or more interactions associated with the set of computing devices $\mathbf{508}_{1\text{-}M}$, the set of multi-purpose devices $\mathbf{510}_{1\text{-}N}$, and/or the set of computing devices $\mathbf{512}_{1\text{-}P}$. For instance, one or more cyber-attacks associated with the set of computing devices $\mathbf{508}_{1\text{-}M}$, the set of multi-purpose devices $\mathbf{510}_{1\text{-}N}$, and/or the set of computing devices $\mathbf{512}_{1\text{-}P}$ can be mitigated by employing the security sentinel 504 and the security sentinel 506 in the communication network 502. Additionally or alternatively, scalability of one or more cyber-attacks within the communication network 502 associated with the set of computing devices $\mathbf{508}_{1\text{-}M}$, the set of multi-purpose devices $\mathbf{510}_{1\text{-}N}$, and/or the set of computing devices $\mathbf{512}_{1\text{-}P}$ can be prevented by employing the security sentinel 504 and the security sentinel 506 in the communication network 502. Additionally or alternatively, cross-contamination of one or more cyber-attacks amongst the set of computing devices $\mathbf{508}_{1\text{-}M}$, the set of multi-purpose devices $\mathbf{510}_{1\text{-}N}$, and/or the set of computing devices $\mathbf{512}_{1\text{-}P}$ can be prevented by employing the security sentinel 504 and the security sentinel 506 in the communication network 502. In an embodiment, the security sentinel 504 (e.g., the security sentinel component 102 of the security sentinel 504) can be communicatively coupled to the set of computing devices $\mathbf{508}_{1\text{-}M}$ and the set of multi-purpose devices $\mathbf{510}_{1\text{-}N}$. For instance, the security sentinel 504 (e.g., the security sentinel component 102 of the security sentinel 504) can be implemented between the set of computing devices $\mathbf{508}_{1\text{-}M}$ and the set of multi-purpose devices $\mathbf{510}_{1\text{-}N}$ in the communication network 502. Furthermore, the security sentinel 506 (e.g., the security sentinel component 102 of the security sentinel 506) can be communicatively coupled to the set of multi-purpose devices $\mathbf{510}_{1\text{-}N}$ and the set of computing devices $\mathbf{512}_{1\text{-}P}$. For instance, the security sentinel 506 (e.g., the security sentinel component 102 of the security sentinel 506) can be implemented between the set of multi-purpose devices $\mathbf{510}_{1\text{-}N}$ and the set of computing devices $\mathbf{512}_{1\text{-}P}$ in the communication network 502. As such, secure usage and/or secure operation of the set of multi-purpose devices $\mathbf{510}_{1\text{-}N}$ within the communication network 502 can be provided.

Figure 6:
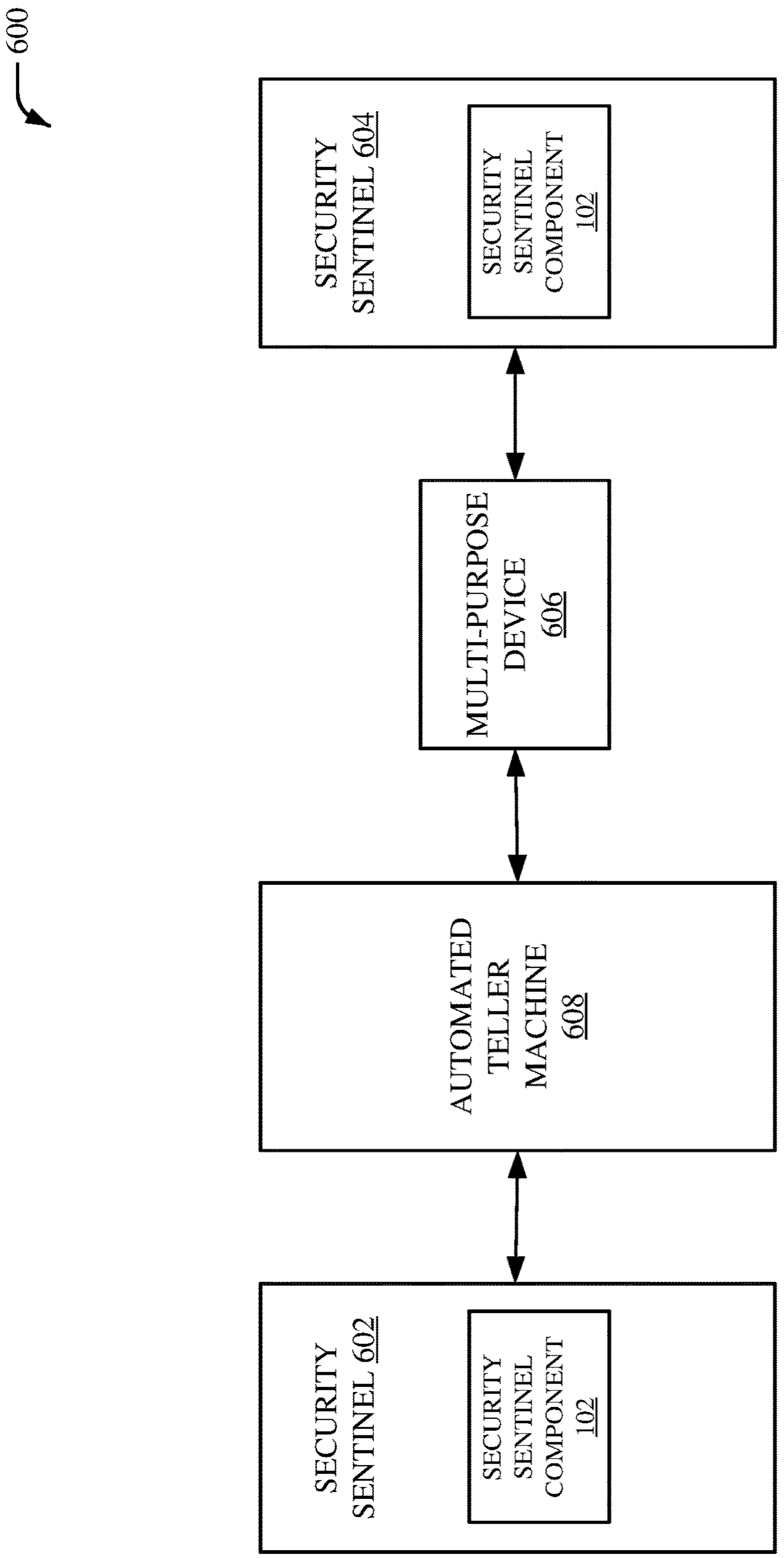
FIG. 6 illustrates an example, non-limiting system that includes an automated teller machine and multiple security sentinels in accordance with one or more embodiments described herein.

FIG. 6 illustrates a block diagram of an example, non-limiting system 600 in accordance with one or more embodiments described herein. Repetitive description of like elements employed in other embodiments described herein is omitted for sake of brevity.

The system 600 includes a security sentinel 602, a security sentinel 604, a multi-purpose device 606 and an automated teller machine 608. In an embodiment, the security sentinel 602 can include the security sentinel component 102 disclosed herein in connection with FIG. 1, FIG. 2, FIG. 3, FIG. 4 and/or FIG. 5. Additionally or alternatively, the security sentinel 604 can include the security sentinel component 102 disclosed herein in connection with FIG. 1, FIG. 2, FIG. 3, FIG. 4 and/or FIG. 5. For example, the security sentinel component 102 included in the security sentinel 602 can correspond to the security sentinel component 102 disclosed herein in connection with FIG. 1, FIG. 2, FIG. 3, FIG. 4 and/or FIG. 5. Furthermore, the security sentinel 604 can correspond to the at least one security sentinel disclosed herein in connection with FIG. 1, FIG. 2, FIG. 3, FIG. 4 and/or FIG. 5. In another example, the security sentinel component 102 included in the security sentinel 604 can correspond to the security sentinel component 102 disclosed herein in connection with FIG. 1, FIG. 2, FIG. 3, FIG. 4 and/or FIG. 5. Furthermore, the security sentinel 602 can correspond to the at least one security sentinel disclosed herein in connection with FIG. 1, FIG. 2, FIG. 3, FIG. 4 and/or FIG. 5. The security sentinel component 102 included in the security sentinel 602 can include the communication component 104, the security component 106, the memory 108, the processor 110, the password management component 202, the protocol component 302 and/or the encryption algorithm component 402 disclosed herein in connection with FIG. 1, FIG. 2, FIG. 3, FIG. 4 and/or FIG. 5. Additionally or alternatively, the security sentinel component 102 included in the security sentinel 604 can include the communication component 104, the security component 106, the memory 108, the processor 110, the password management component 202, the protocol component 302 and/or the encryption algorithm component 402 disclosed herein in connection with FIG. 1, FIG. 2, FIG. 3, FIG. 4 and/or FIG. 5. The security sentinel 602 can be hardware, software, or a combination of hardware and software. Furthermore, security sentinel 604 can be hardware, software, or a combination of hardware and software. In an embodiment, the security sentinel 602 and the security sentinel 604 can be embedded on the same hardware. In another embodiment, the security sentinel 602 and the security sentinel 604 can be embedded on different hardware. In certain embodiments, the security sentinel 602 and/or the security sentinel 604 can be coupled to a network device such as, for example, a router device, an access point device, a server device, or another type of network device. In certain embodiments, the security sentinel 602 and/or the security sentinel 604 can be embedded into a network device such as, for example, a router device, an access point device, a server device or another type of network device. The multi-purpose device 606 can be, for example, a smartphone, a mobile device, a tablet computer, a wearable device, a portable electronic device, an electronic device associated with a display, and/or another device.

The automated teller machine 608 can be an electronic telecommunications device that facilitates one or more financial transactions and/or one or more financial operations for a user identity associated with the multi-purpose device 606. In an aspect, the automated teller machine 608 can provide currency in response to one or more actions performed by the multi-purpose device 606. In an embodiment, the multi-purpose device 606 can be registered with a financial institution associated with the automated teller machine 608. During a registration process associated with the financial institution, the multi-purpose device 606 can be assigned a fingerprint identifier. The fingerprint identifier can be, for example, a digital set of binary data that uniquely identifies the multi-purpose device 606 and/or correlates the multi-purpose device 606 with the user identity. In an aspect, a software application for the financial institution can be downloaded on the multi-purpose device 606, for example, in response to successful registration of the multi-purpose device 606.

In an embodiment, the fingerprint identifier for the multi-purpose device 606 can include an Integrated Circuit Card Identifier (ICCID) for the multi-purpose device 606 and/or an International Mobility Equipment Identity (IMEI) for the multi-purpose device 606. The ICCID for the multi-purpose device 606 can be linked to a subscriber identity module (SIM) card for the multi-purpose device 606. In certain embodiments, in response to a determination that one or more additional fingerprint identifiers is needed for the multi-purpose device 606, one or more corresponding digital files can be embedded into the multi-purpose device 606. The one or more fingerprint identifier for the multi-purpose device 606 and/or associated account information for the multi-purpose device 606 can be stored for example, a database associated with the financial institution. Furthermore, the one or more fingerprint identifier for the multi-purpose device 606 and/or associated account information for the multi-purpose device 606 can be provided to the security sentinel 602 and the security sentinel 604. One or more passwords for the multi-purpose device 606, one or more encryption parameters for the multi-purpose device 606, one or more handshake tokens for a handshaking communication protocol for the multi-purpose device 606, one or more parameters for the multi-purpose device 606, and/or other data associated with the multi-purpose device 606 can also be provided to the security sentinel 602 and the security sentinel 604. In an aspect, the one or more fingerprint identifiers for the multi-purpose device 606, the one or more passwords for the multi-purpose device 606, one or more encryption parameters for the multi-purpose device 606, one or more handshake tokens for a handshaking communication protocol for the multi-purpose device 606, one or more parameters for the multi-purpose device 606, and/or other data associated with the multi-purpose device 606 can be employed once by the multi-purpose device 606 and replaced with a new fingerprint identifier, a new password, a new encryption parameter, a new handshake token, a new parameter, and/or other new data in response to being employed once by the multi-purpose device 606. As such, the one or more fingerprint identifiers for the multi-purpose device 606, the one or more passwords for the multi-purpose device 606, one or more encryption parameters for the multi-purpose device 606, one or more handshake tokens for a handshaking communication protocol for the multi-purpose device 606, one or more parameters for the multi-purpose device 606, and/or other data associated with the multi-purpose device 606 can be dynamic data. The one or more fingerprint identifiers for the multi-purpose device 606, the one or more passwords for the multi-purpose device 606, one or more encryption parameters for the multi-purpose device 606, one or more handshake tokens for a handshaking communication protocol for the multi-purpose device 606, one or more parameters for the multi-purpose device 606, and/or other data associated with the multi-purpose device 606 can also be encrypted. In certain embodiments, at least a portion of the one or more fingerprint identifiers for the multi-purpose device 606, the one or more passwords for the multi-purpose device 606, one or more encryption parameters for the multi-purpose device 606, one or more handshake tokens for a handshaking communication protocol for the multi-purpose device 606, one or more parameters for the multi-purpose device 606, and/or other data associated with the multi-purpose device 606 can be stored by the security sentinel 602 and the security sentinel 604 without being provided to the financial institution associated with the automated teller machine 608.

During a transaction associated with the automated teller machine 608, an account owner (e.g., a user) associated with the user identity can employ the software application installed on the multi-purpose device 606 to transmit the one or more fingerprint identifiers to the security sentinel 604. The security sentinel 604 can authenticate the multi-purpose device 606 based on data stored by the security sentinel 604 such as, for example, a fingerprint identifier for the multi-purpose device 606 stored by the security sentinel 604. Upon verification of the multi-purpose device 606, the security sentinel 604 can send an associated encrypted password through a communication channel linked to the ICCID for the multi-purpose device 606 stored by the security sentinel 604 and/or the security sentinel 602. As such, the multi-purpose device 606 only receives an encrypted password in response to a determination the multi-purpose device 606 is a correct multi-purpose device to receive the encrypted password. Furthermore, spoofing associated with a cyber-attack can be avoided. A duplicate SIM card (e.g., ICCID) can additionally or alternatively be employed to determine a security conflict associated with the multi-purpose device 606. The encrypted password can then be transmitted (e.g., via near-field communication associated with the multi-purpose device 606) to a near-field communication component incorporated into the automated teller machine 608. The use of NFC can ensure proximity between the multi-purpose device 606 (e.g., the account owner) and the automated teller machine 608 during the transaction. The use of NFC can also identify a specific automated teller machine (e.g., the automated teller machine 608) to be activated upon access being granted. The encrypted password can then be transmitted by the automated teller machine 608 to the security sentinel 602 for decryption and/or authentication of the multi-purpose device 606. Upon verification, a handshaking communication protocol process can be initiated and access to the automated teller machine 608 by the multi-purpose device 606 can be granted upon completion and input of a passcode (e.g., a personal identification number) for the user identity. Updates to a password, one or more encryption parameters, one or more handshake tokens and/or one or more parameters can be accomplished through a corresponding communication connection and/or through a separate direct communication connection between the security sentinel 602 and the security sentinel 604.

Figure 7:
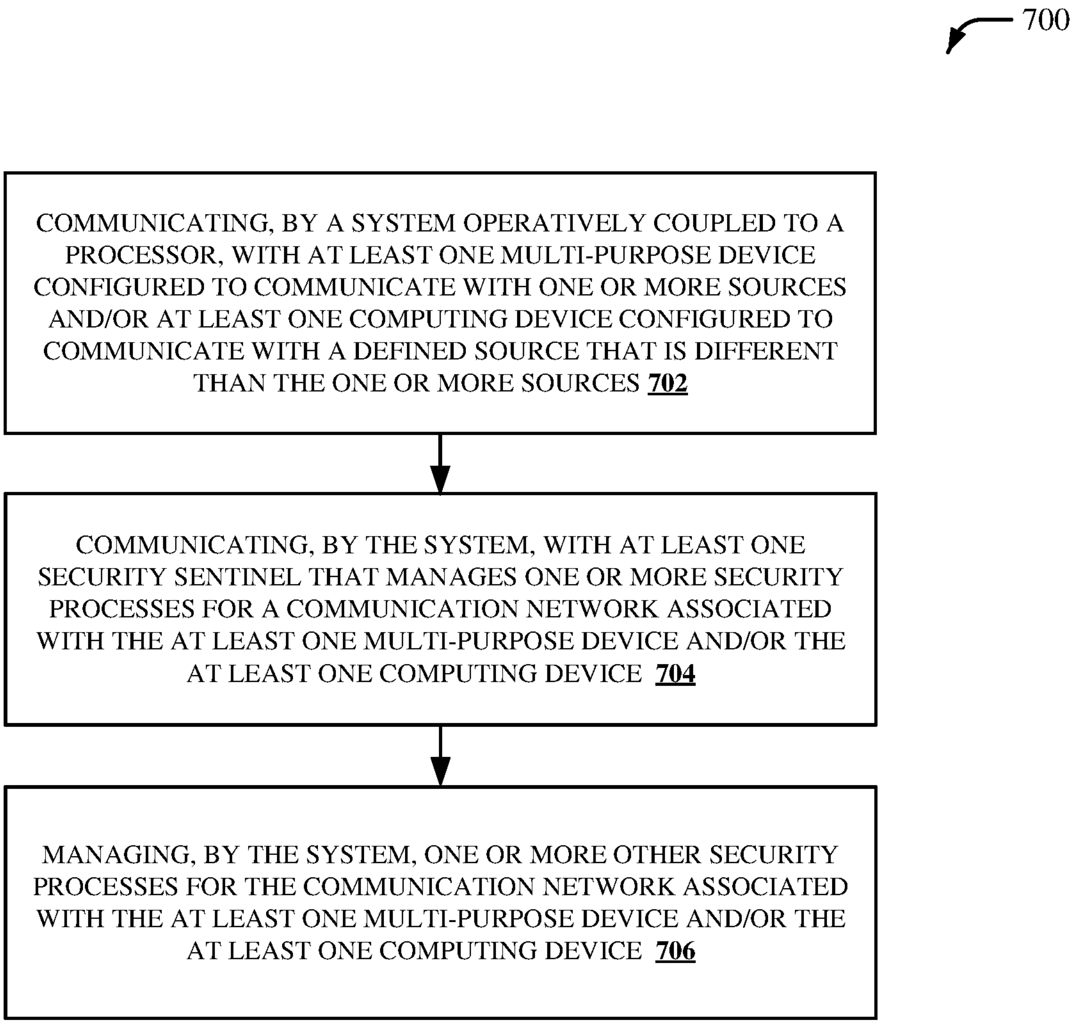
FIG. 7 illustrates a flow diagram of an example, non-limiting computer-implemented method for facilitating multiple sentinels for securing communications in accordance with one or more embodiments described herein.
Figure 8:
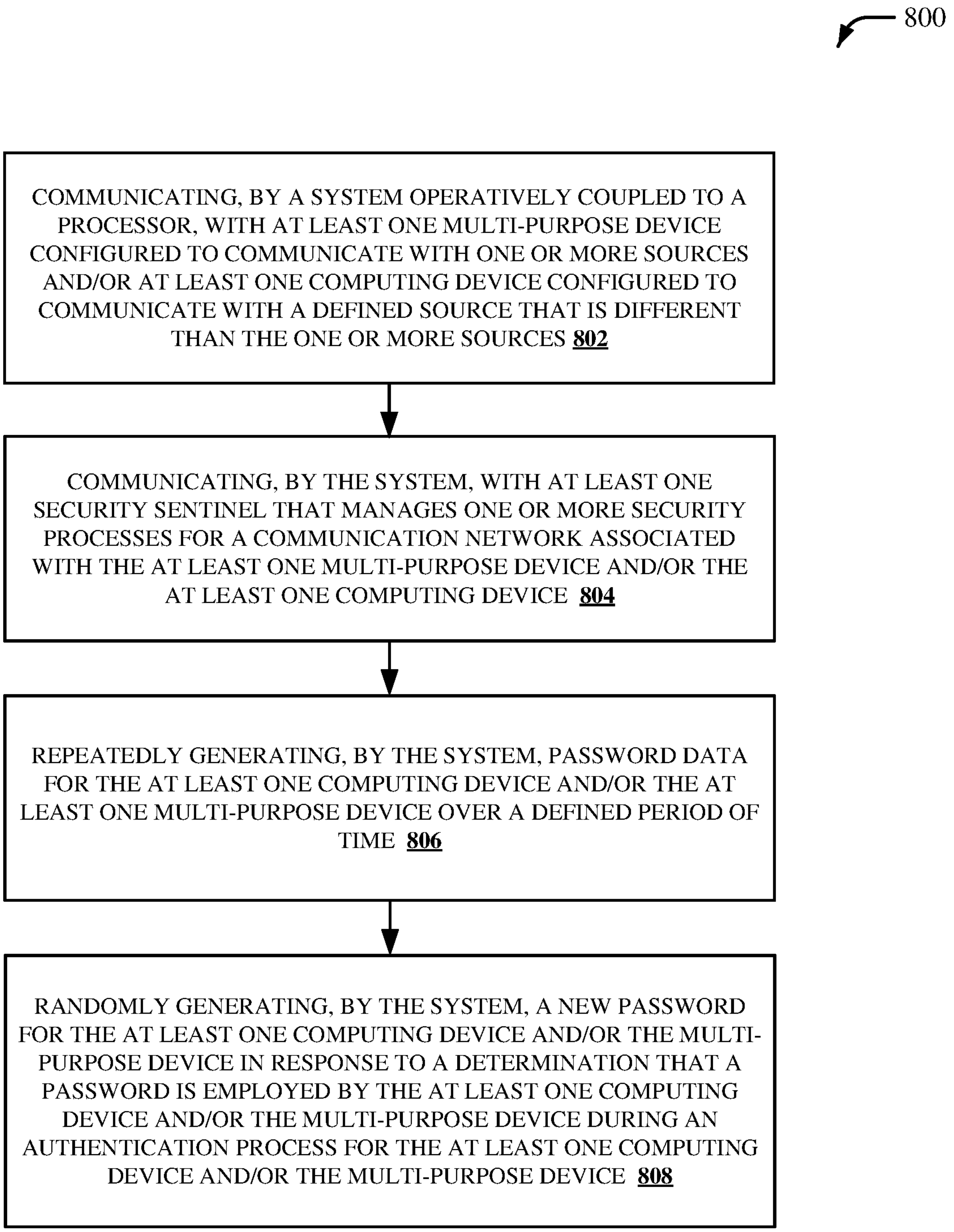
FIG. 8 illustrates a flow diagram of another example, non-limiting computer-implemented method for facilitating multiple sentinels for securing communications in accordance with one or more embodiments described herein.
Figure 9:
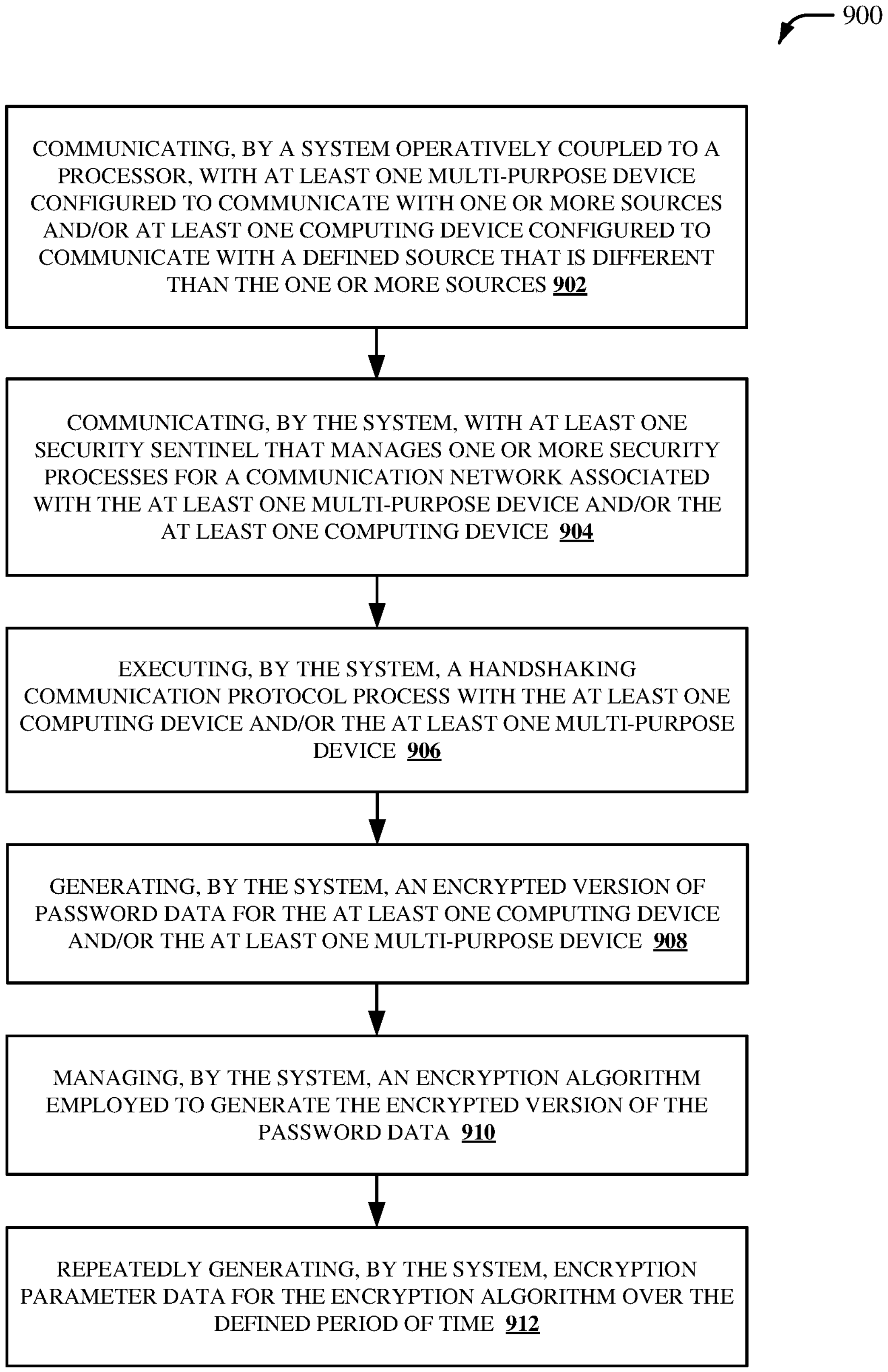
FIG. 9 illustrates a flow diagram of yet another example, non-limiting computer-implemented method for facilitating multiple sentinels for securing communications in accordance with one or more embodiments described herein.

FIGS. 7-9 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts can occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

FIG. 7 illustrates a flow diagram of an examplary non-limiting computer-implemented method 700 for facilitating multiple sentinels for securing communications in accordance with one or more embodiments described herein. Repetitive description of like elements employed in other embodiments described herein is omitted for sake of brevity. At 702, communication is performed, by a system operatively coupled to a processor (e.g., by communication component 104), with at least one multi-purpose device configured to communicate with one or more sources and/or at least one computing device configured to communicate with a defined source that is different than the one or more sources. The at least one multi-purpose device can be configured to communicate with one or more sources. For instance, the at least one multi-purpose device can be configured to operate in one or more network security frameworks. In an aspect, the at least one multi-purpose device can access the communication network. The at least one multi-purpose device can also transmit data and/or receive data via the communication network. In another aspect, the at least one multi-purpose device can respond to one or more communication exchanges from the one or more sources. One or more portions of the at least one multi-purpose device can also be modified and/or updated by the one or more sources. In an example, the at least one multi-purpose device can include one or more smartphones, one or more mobile devices, one or more tablet computers, one or more laptop computers, one or more personal computers, one or more television devices, one or more appliance devices, one or more wearable devices, one or more portable electronic devices, one or more electronic devices associated with a display, and/or one or more other devices. The at least one computing device can be configured to communicate with a defined source that is different than the one or more sources. For instance, the at least one computing device can be a remotely accessible device or system. Furthermore, the at least one computing device can be configured to perform one or more download processes that receive one or more updates and/or one or more modifications for the at least one computing device from a defined source. The defined source can be, for example, a secure central command center and/or another defined source. The at least one computing device can additionally or alternatively be configured to receive one or more commands from a defined source such as, for example, the at least one security sentinel. The at least one computing device can include, for example, one or more IoT devices, one or more slave device, one or more slave systems, one or more slave application, and/or one or more other computing devices.

At 704, communication is performed, by the system (e.g., by communication component 104), with at least one security sentinel that manages one or more security processes for a communication network associated with the at least one multi-purpose device and/or the at least one computing device. The at least one security sentinel can manage one or more security processes for the communication network associated with the at least one multi-purpose device and/or the at least one computing device. For example, the at least one security sentinel can manage and/or generate one or more commands associated with security for the at least one multi-purpose device and/or the at least one computing device.

At 706, one or more other security processes for the communication network associated with the at least one multi-purpose device and/or the at least one computing device is performed by the system (e.g., by security component 106). In an embodiment, password data for the at least one computing device and/or the at least one multi-purpose device can be repeatedly generated over a defined period of time. In another embodiment, a handshaking communication protocol process can be executed with the at least one computing device and/or the at least one multi-purpose device. Furthermore, an encrypted version of the password data can be generated. In yet another embodiment, an encryption algorithm employed to generate the encrypted version of the password data can be managed. Furthermore, an encryption parameter data for the encryption algorithm can be repeatedly generated over the defined period of time.

FIG. 8 illustrates a flow diagram of an examplary non-limiting computer-implemented method 800 for facilitating multiple sentinels for securing communications in accordance with one or more embodiments described herein. Repetitive description of like elements employed in other embodiments described herein is omitted for sake of brevity. At 802, communication is performed, by a system operatively coupled to a processor (e.g., by communication component 104), with at least one multi-purpose device configured to communicate with one or more sources and/or at least one computing device configured to communicate with a defined source that is different than the one or more sources. At 804, communication is performed, by the system (e.g., by communication component 104), with at least one security sentinel that manages one or more security processes for a communication network associated with the at least one multi-purpose device and/or the at least one computing device. At 806, password data for the at least one computing device and/or the at least one multi-purpose device is repeatedly generated, by the system (e.g., by password management component 202), over a defined period of time. At 808, a new password for the at least one computing device and/or the at least one multi-purpose device is randomly generated, by the system (e.g., by password management component 202), in response to a determination that a password is employed by the at least one computing device and/or the at least one multi-purpose device during an authentication process for the at least one computing device and/or the at least one multi-purpose device.

FIG. 9 illustrates a flow diagram of an examplary non-limiting computer-implemented method 900 for facilitating multiple sentinels for securing communications in accordance with one or more embodiments described herein. Repetitive description of like elements employed in other embodiments described herein is omitted for sake of brevity. At 902, communication is performed, by a system operatively coupled to a processor (e.g., by communication component 104), with at least one multi-purpose device configured to communicate with one or more sources and/or at least one computing device configured to communicate with a defined source that is different than the one or more sources. At 904, communication is performed, by the system (e.g., by communication component 104), with at least one security sentinel that manages one or more security processes for a communication network associated with the at least one multi-purpose device and/or the at least one computing device. At 906, a handshaking communication protocol process is executed, by the system (e.g., by protocol component 302), with the at least one computing device and/or the at least one multi-purpose device. At 908, an encrypted version of password data for the at least one computing device and/or the at least one multi-purpose device is generated by the system (e.g., by protocol component 302). At 910, an encryption algorithm employed to generate the encrypted version of the password data is managed by the system (e.g., by encryption algorithm component 402). At 912, encryption parameter data for the encryption algorithm is repeatedly generated, by the system (e.g., by encryption algorithm component 402), over the defined period of time.

It is understood that the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create ways for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 10, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 10:
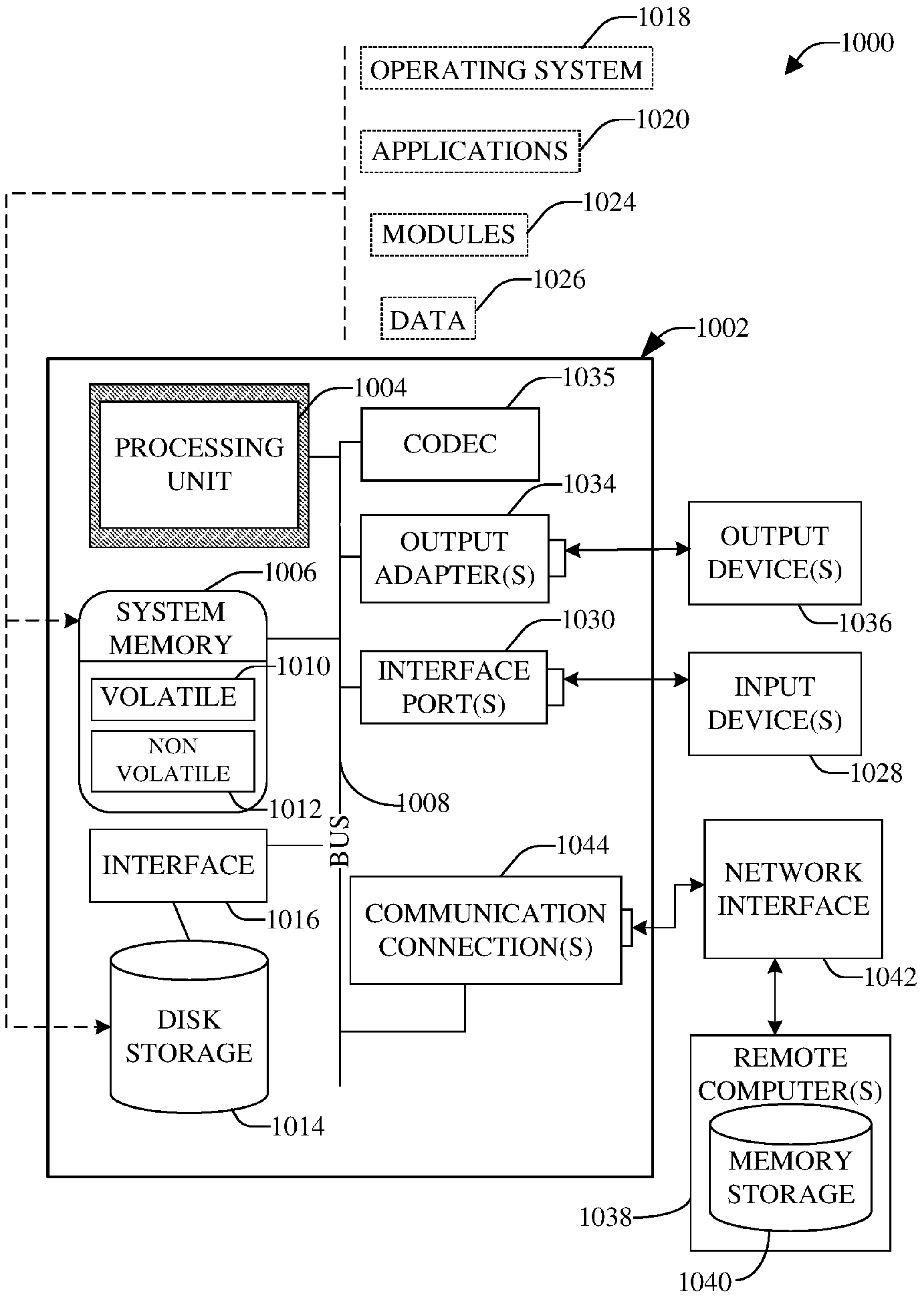
FIG. 10 illustrates a block diagram of an example, non-limiting operating environment in which one or more embodiments described herein can be facilitated.

With reference to FIG. 10, an example environment 1000 for implementing various aspects of the claimed subject matter includes a computer 1002. The computer 1002 includes a processing unit 1004, a system memory 1006, a codec 1035, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1006 includes volatile memory 1010 and non-volatile memory 1012, which can employ one or more of the disclosed memory architectures, in various embodiments. The basic input/output system (BIOS), containing the basic routines to transfer information between elements within the computer 1002, such as during start-up, is stored in non-volatile memory 1012. In addition, according to present innovations, codec 1035 can include at least one of an encoder or decoder, wherein the at least one of an encoder or decoder can consist of hardware, software, or a combination of hardware and software. Although, codec 1035 is depicted as a separate component, codec 1035 can be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1012 can employ one or more of the disclosed memory devices, in at least some embodiments. Moreover, non-volatile memory 1012 can be computer memory (e.g., physically integrated with computer 1002 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1010 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1002 can also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD), flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016. It is appreciated that storage devices 1014 can store information related to a user. Such information might be stored at or provided to a server or to an application running on a user device. In one embodiment, the user can be notified (e.g., by way of output device(s) 1036) of the types of information that are stored to disk storage 1014 or transmitted to the server or application. The user can be provided the opportunity to opt-in or opt-out of having such information collected or shared with the server or application (e.g., by way of input from input device(s) 1028).

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port can be used to provide input to computer 1002 and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a way of connection between the output device 1036 and the system bus 1008. It should be noted that other devices or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other embodiments to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a memory that stores computer executable components;

a processor that executes computer executable components stored in the memory, wherein the computer executable components comprise:

a communication component that communicates with at least one multi-purpose device configured to communicate with one or more sources, at least one computing device configured to communicate with a defined source that is different than the one or more sources, and at least one security sentinel that manages one or more security processes for a communication network associated with the at least one multi-purpose device and the at least one computing device;

a security component that manages one or more other security processes for the communication network associated with the at least one multi-purpose device and the at least one computing device; and a password management component that repeatedly generates password data for the at least one computing device over a defined period of time;

wherein the password management component randomly generates a new password for the at least one computing device in response to a determination that a password is employed by the at least one computing device during an authentication process for the at least one computing device.

2. The system of claim 1, wherein the computer executable components comprise:

a protocol component that executes a handshaking communication protocol process with the at least one computing device, wherein the handshaking communication protocol process comprises generation of an encrypted version of the password data.

3. The system of claim 1, wherein the password data is first password data, and wherein the password management component repeatedly generates second password data for the at least one multi-purpose device over the defined period of time.

4. The system of claim 3, wherein the password management component randomly generates a new password for the at least one multi-purpose device in response to a determination that a password is employed by the at least one multi-purpose device during an authentication process for the at least one multi-purpose device.

5. The system of claim 4, wherein the computer executable components comprise:

a protocol component that executes a handshaking communication protocol process with the at least one multi-purpose device, wherein the handshaking communication protocol process comprises generation of an encrypted version of the second password data.

6. The system of claim 5, wherein the computer executable components comprise:

an encryption algorithm component that manages an encryption algorithm employed to generate the encrypted version of the second password data, wherein the encryption algorithm component repeatedly generates encryption parameter data for the encryption algorithm over the defined period of time.

7. A computer-implemented method, comprising:

communicating, by a system operatively coupled to a processor, with at least one multi-purpose device configured to communicate with one or more sources and at least one computing device configured to communicate with a defined source that is different than the one or more sources;

communicating, by the system, with at least one security sentinel that manages one or more security processes for a communication network associated with the at least one multi-purpose device and the at least one computing device;

managing, by the system, one or more other security processes for the communication network associated with the at least one multi-purpose device and the at least one computing device;

repeatedly generating, by the system, password data for the at least one computing device over a defined period of time; and randomly generating, by the system, a new password for the at least one computing device in response to a determination that a password is employed by the at least one computing device during an authentication process for the at least one computing device.

8. The computer-implemented method of claim 7, further comprising:

executing, by the system, a handshaking communication protocol process with the at least one computing device; and generating, by the system, an encrypted version of the password data.

9. The computer-implemented method of claim 7, further comprising:

repeatedly generating, by the system, password data for the at least one multi-purpose device over a defined period of time.

10. A computer readable storage device comprising instructions that, in response to execution, cause a system comprising a processor to perform operations, comprising:

communicating with at least one multi-purpose device configured to communicate with one or more sources and at least one computing device configured to communicate with a defined source that is different than the one or more sources;

communicating with at least one security sentinel that manages one or more security processes for a communication network associated with the at least one multi-purpose device and the at least one computing device; and managing one or more other security processes for the communication network associated with the at least one multi-purpose device and the at least one computing device, wherein the managing comprises (a) repeatedly generating password data for the at least one computing device over a defined period of time and (b) randomly generating a new password for the at least one computing device in response to a determination that a password is employed by the at least one computing device during an authentication process for the at least one computing device.

11. The computer readable storage device of claim 10, wherein the managing comprises executing a handshaking communication protocol process with the at least one computing device and generating an encrypted version of the password data.

* * * * *